US008090913B2

(12) United States Patent
Pelley, III et al.

(10) Patent No.: US 8,090,913 B2
(45) Date of Patent: Jan. 3, 2012

(54) COHERENCY GROUPS OF SERIALLY COUPLED PROCESSING CORES PROPAGATING COHERENCY INFORMATION CONTAINING WRITE PACKET TO MEMORY

(75) Inventors: Perry H. Pelley, III, Austin, TX (US); George P. Hoekstra, Austin, TX (US); Lucio F. Pessoa, Cedar Park, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 12/972,878

(22) Filed: Dec. 20, 2010

(65) Prior Publication Data

US 2011/0093660 A1    Apr. 21, 2011

Related U.S. Application Data

(62) Division of application No. 12/103,250, filed on Apr. 15, 2008, now Pat. No. 7,941,637.

(51) Int. Cl.
*G06F 12/08* (2006.01)
(52) U.S. Cl. ............................ 711/141; 712/16; 712/225
(58) Field of Classification Search ........................ None
See application file for complete search history.

(56) References Cited

U.S. PATENT DOCUMENTS

| | | | |
|---|---|---|---|
| 6,678,773 B2 | 1/2004 | Marietta et al. | |
| 6,754,752 B2 | 6/2004 | Marietta et al. | |
| 6,862,283 B2 | 3/2005 | Marietta et al. | |
| 6,996,651 B2 | 2/2006 | Garinger et al. | |
| 7,031,258 B1 | 4/2006 | Frisch et al. | |
| 7,106,742 B1 | 9/2006 | Frisch et al. | |
| 7,240,160 B1 | 7/2007 | Hetherington et al. | |
| 2005/0108469 A1 | 5/2005 | Freeman et al. | |
| 2005/0228939 A1 | 10/2005 | Janzen | |
| 2006/0143384 A1 | 6/2006 | Hughes et al. | |
| 2006/0200598 A1 | 9/2006 | Janzen | |
| 2007/0074011 A1 | 3/2007 | Borkar et al. | |
| 2007/0130445 A1 | 6/2007 | Lau et al. | |
| 2007/0168620 A1 | 7/2007 | Leonard et al. | |

OTHER PUBLICATIONS

Bautista, "Tera-scale Computing—the Role interconnects in Volume Compute Platforms", International Interconnect Technology Conference, IEEE 2007, Jun. 4-6, 2007, pp. 187-189.
PCI Express Standard, Base Specification Revision 2.0', Dec. 2006.
RapidIO Standard; "Interconnect Specification Part 1: Input/Output Logical Specification Rev. 1.3", Jun. 2005.
Non-Published U.S. Appl. No. 11/668,267, filed Jan. 29, 2007, with the first named Inventor listed as Perry H. Pelley, III.

*Primary Examiner* — Kenneth Kim
(74) *Attorney, Agent, or Firm* — James L. Clingan, Jr.; David G. Dolezal; Jonathan N. Geld

(57) ABSTRACT

A system has a first plurality of cores in a first coherency group. Each core transfers data in packets. The cores are directly coupled serially to form a serial path. The data packets are transferred along the serial path. The serial path is coupled at one end to a packet switch. The packet switch is coupled to a memory. The first plurality of cores and the packet switch are on an integrated circuit. The memory may or may not be on the integrated circuit. In another aspect a second plurality of cores in a second coherency group is coupled to the packet switch. The cores of the first and second pluralities may be reconfigured to form or become part of coherency groups different from the first and second coherency groups.

5 Claims, 4 Drawing Sheets

COHERENCY GROUPS OF SERIALLY COUPLED PROCESSING CORES PROPAGATING COHERENCY INFORMATION CONTAINING WRITE PACKET TO MEMORY

BACKGROUND

1. Field

This disclosure relates generally to processing systems, and more specifically, to processing systems having a plurality of cores.

2. Related Art

Processing of data has been found to be more efficient if a plurality of cores is utilized. A multi-core system allows for simultaneous processing of different tasks. Complex operations tend to be able to be divided into multiple tasks so the multi-core system tends to work well for complex operations. Very complex operations can have many tasks so that it can be beneficial to have many cores. The operations must be coordinated so that the results of the different cores must also be coordinated. Included in this is that the memory being used must be able to remain coherent. That is to say, the cores must be able to use information from a main memory because the cache which may be with each core, is not sufficient. Memory coherency can be difficult to maintain in any system using a cache, and it becomes more complex as the number of cores increases.

Thus there is a need for a system that is multi-core while solving or improving upon existing problems with multi-core systems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect, a system has a first plurality of cores in a first coherency group. Each core transfers data in packets. The cores are directly coupled serially to form a serial path. The data packets are transferred along the serial path. The serial path is coupled at one end to a packet switch. The packet switch is coupled to a memory. The first plurality of cores and the packet switch are on an integrated circuit. The memory may or may not be on the integrated circuit. In another aspect a second plurality of cores in a second coherency group is coupled to the packet switch. The cores of the first and second pluralities may be reconfigured to form or become part of coherency groups different from the first and second coherency groups. This is better understood by reference to the following description and the drawings.

Figure 1:
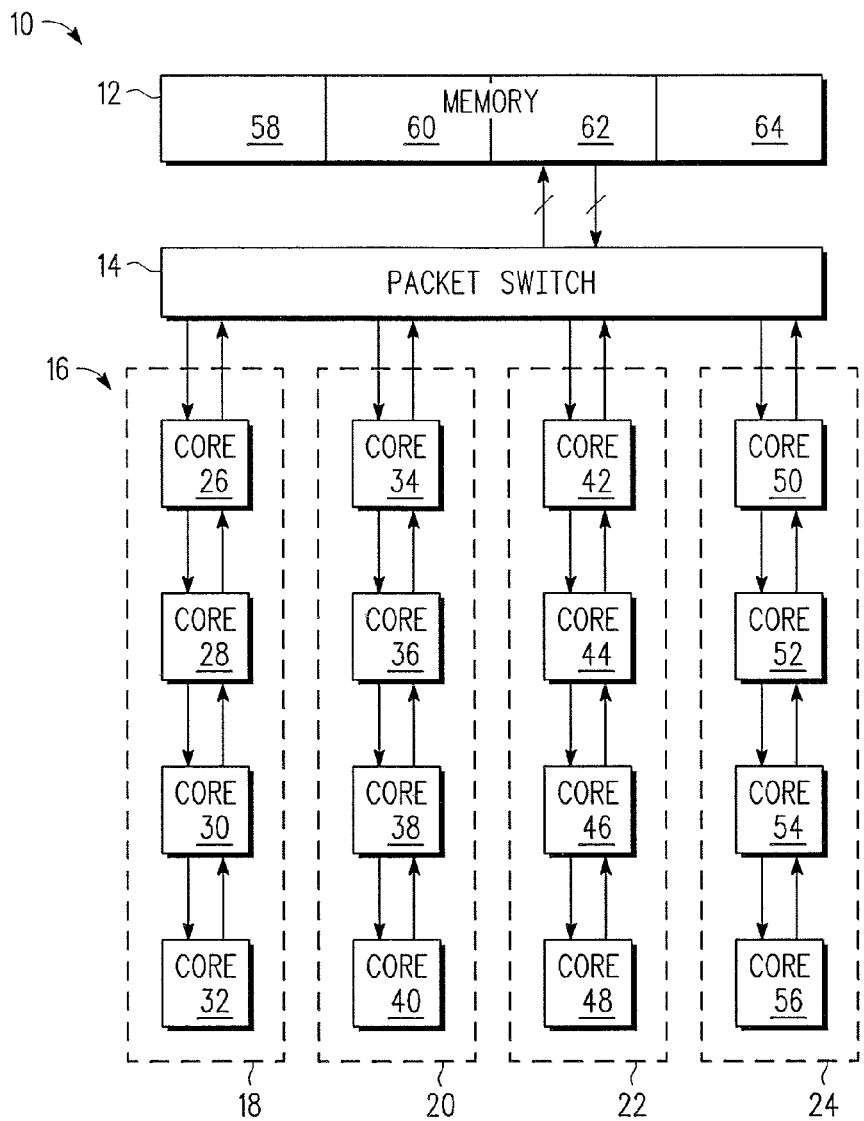
FIG. 1 is a block diagram of a system according to an embodiment.

Shown in FIG. 1 is a multi-core system 10 comprising a memory 12, a packet switch 14, and an array 16 of cores coupled to form a coherency group 18, a coherency group 20, a coherency group 22, and a coherency group 24. Coherency group 18 comprises a core 26 coupled to packet switch 14, a core 28 coupled to core 26, a core 30 coupled to core 28, and a core 32 coupled to core 30. Coherency group 20 comprises a core 34 coupled to packet switch 14, a core 36 coupled to core 34, a core 38 coupled to core 36, and a core 40 coupled to core 38. Coherency group 22 comprises a core 42 coupled to packet switch 14, a core 44 coupled to core 42, a core 46 coupled to core 44, and a core 48 coupled to core 46. Coherency group 24 comprises a core 50 coupled to packet switch 14, a core 52 coupled to core 50, a core 54 coupled to core 52, and a core 56 coupled to core 54. Cores 26, 28, 30, and 32 are serially coupled so that coherency group 18 transfers packets of data serially. Similarly, coherency groups 20, 22, and 24 each serially coupled cores that transfer data along a serial data path. Memory 12 has partitions 58, 60, 62, and 64 associated with coherency groups 18, 20, 22, and 24, respectively. A packet of data includes the data itself and also additional information about the packet. Additional information may include error correction, packet order, target ID, source ID, priority, and size. One example of a protocol for propagating packets is the RapidIO™ (trademark of Freescale Semiconductor, Inc.) protocol. A packet may include other kinds of information other than data such as control information.

Figure 2:
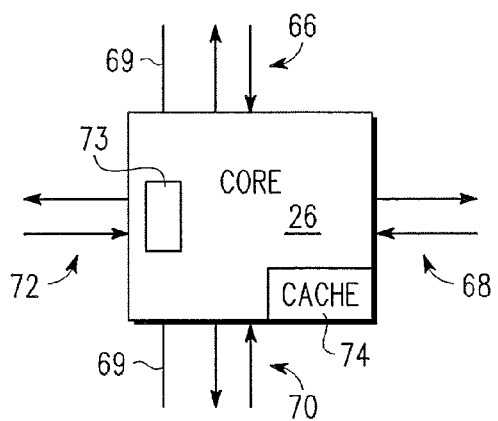
FIG. 2 is a block diagram of a core used in the system of FIG. 1.

Shown in FIG. 2 is core 26, representative of all of the cores of FIG. 1, in more detail. Core 26 has a cache 74 and at least two ports 66 and 70. In coherency group 18, core 26 has one port coupled to packet switch 14 and another port coupled to a port of core 28. Each coherency group has a first terminal coupled to packet switch 14. Each coherency group also has a second terminal as well where there is a core that is only coupled to one other core. Thus the first terminal of coherency groups 20, 22, and 24 is where cores 34, 42, and 50, respectively, are coupled to packet switch 14. The second terminal of coherency groups 18, 20, 22, and 24 are at cores 32, 40, 48, and 56, respectively. Core 26 is shown as having two additional ports 72 and 68 for a total of four ports and a reconfiguration register 73 responsive to a signal on a reconfiguration line 69. Additional ports 72 and 68 and reconfiguration register 73 are used to reconfigure system 10.

In an exemplary operation, a packet of data is to be transferred, which may also be called propagated, from core 30 to memory 12. Included in this operation is the writing of the cache resident in core 30. The packet will be transferred from core 30 to core 28. Core 28 will pass the packet to core 26. Core 26 will pass the packet to packet switch 14. Packet switch 14 will then write the packet to partition 58 of memory 12. Core 30 will also pass the packet to core 32. The transfer of data between cores occurs very quickly so there is minimal delay. This may even be done optically, by radio frequency, or low voltage differential signaling. In the case of radio frequency, active development of ultra wideband wireless communication is showing promise for reliable manufacturing. In addition, each core will need to at least read the address where the packet will be written. If the address is a cache hit, then that entry in the cache is flagged as being invalid. Caches routinely have valid bits that can be set to indicate either that the data at that location is valid or invalid. Alternatively, but at the cost of slowing down the transfer somewhat, the data can also be read and the cache updated. In either case, the cache of each core is kept coherent. Using cache 74 as an example, core 26 will receive the packet from core 28 and quickly transfer it to packet switch 14 while also at least reading the address or addresses. If data is stored in cache 74 at that address or one of the addresses, then it is a cache hit. Then either the valid bit for that location where the hit occurred is set to indicate invalidity or the location is written with the data. In this example, coherency group 18 is allowed to write to only partition 58 to ensure coherency is maintained. It is less of a problem for coherency group 18 to read from partitions 60, 62, or 64 but still the caches of cores 26, 28, 30, and 32 must be prevented from being updated when doing so. For the case of core 32, core 30 does not necessarily need to send the whole packet in order to provide the needed write coherency information. It may be sufficient to simply send the address or addresses and whether it is a read or a write in order to provide the necessary write coherency information so that core 32 can maintain coherency in its cache.

Figure 3:
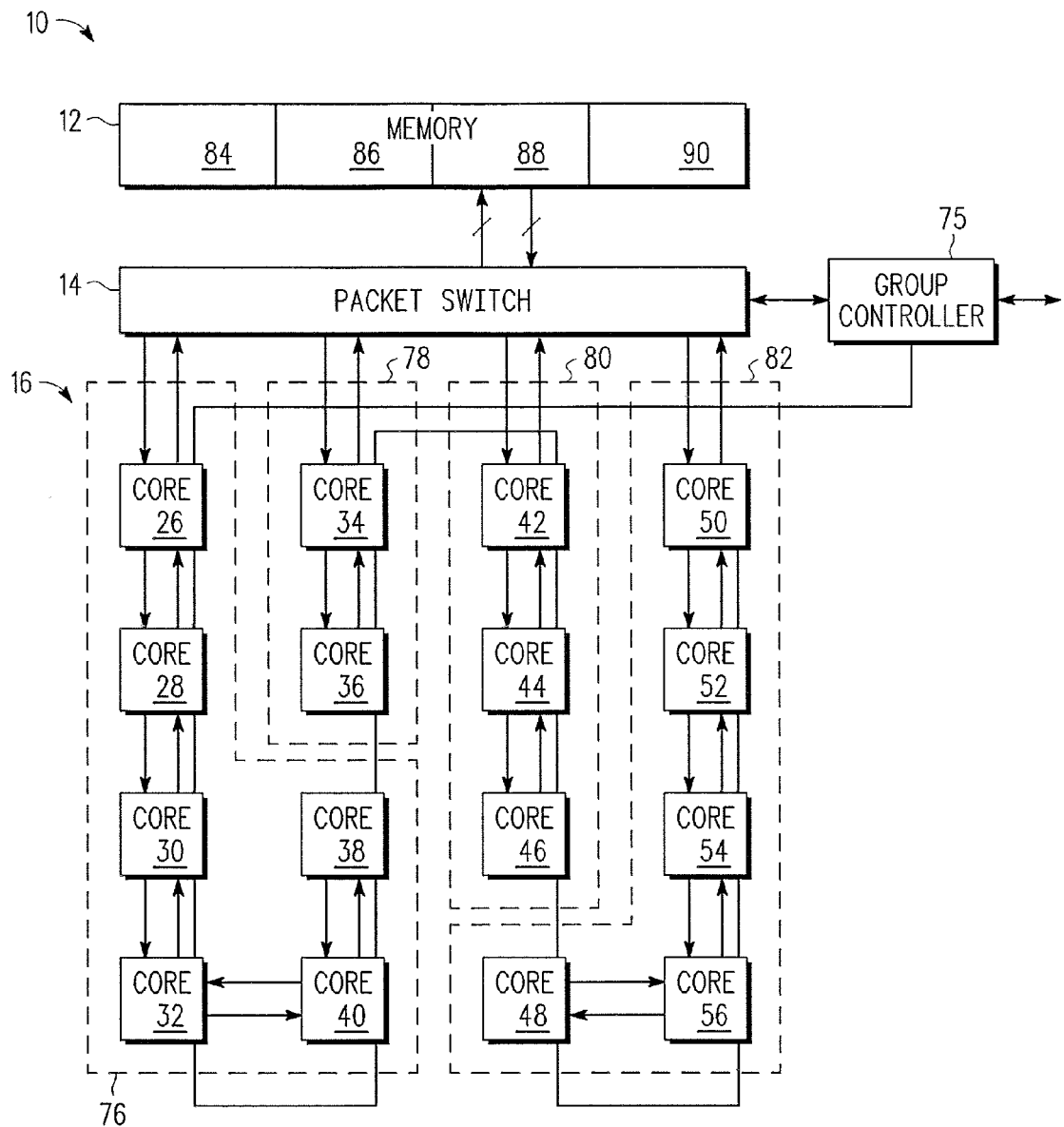
FIG. 3 is a block diagram of the system of FIG. 1 in an alternative configuration.

Shown in FIG. 3 is system 10 reconfigured from that shown in FIG. 1 using a group controller 75. Group controller 75 sends a signal, serially, to all of the cores of array 16 to reconfigure the ports of the cores and thus reconfigure array 16 and thus system 10. This line can also be used for debugging. Group controller 75 also is accessible externally to the integrated circuit through a port. Group controller 75 is coupled to the packet switch 14 for controlling packet switch 14 and accessing memory 12. Memory 12 may also be reconfigured. The reconfiguration of memory 12 as shown as having partitions 84, 86, 88, and 90. As suggested by FIG. 3, partitions 84, 86, 88, and 90 may be of different sizes. In the configuration of FIG. 3, cores 26, 28, 30, 32, 40, and 38, form coherency group 76; cores 34 and 36 form coherency group 78; cores 42, 44, and 46, form coherency group 80; and cores 48, 50, 52, 54, and 56 form coherency group 82. Array 16 is arranged in rows and columns so that each core has at least two adjacent cores and may have four adjacent cores. For example core 26 has adjacent cores 34 and 28, and core 38 has adjacent cores 30, 36, 40, and 46. As shown for core 26 in FIG. 2, each core has four ports. Two ports can be configured to be coupled to an adjacent core. In this example, core 40 was reconfigured to be coupled to core 32 instead of being the second terminal of a coherency group. As in the case of coherency groups of FIG. 3, coherency groups 76, 78, 80, and 82 have one core coupled to packet switch 14 as a first terminal and second terminal as the last core in the serially coupled cores. In this case the cores coupled to packet switch 14 are cores 26, 34, 42, and 50 as the first terminal of coherency groups 76, 78, 80, and 82, respectively. The second terminals of coherency groups 76, 78, 80, and 82 are cores 38, 36, 46, and 48, respectively. As described for system 10 of FIG. 1, a packet travels serially to all of the cores within a coherency group. Again using transferring a packet from core 30 to memory 12 as an example, the packet is transferred to core 28 where it is transferred to core 26. Core 26 couples to packet switch 14 which directs the writing into partition 84 of memory 12. Core 30 also transfers the packet to core 32. Core 32 transfers the packet to core 40. Core 40 transfers the packet to core 38. It may not be necessary to transfer the whole packet to cores 32, 40, and 38. Only the address may be needed so that the valid bit in the caches of cores 32, 40, and 38 can be set to the invalid state if there is a hit.

Figure 4:
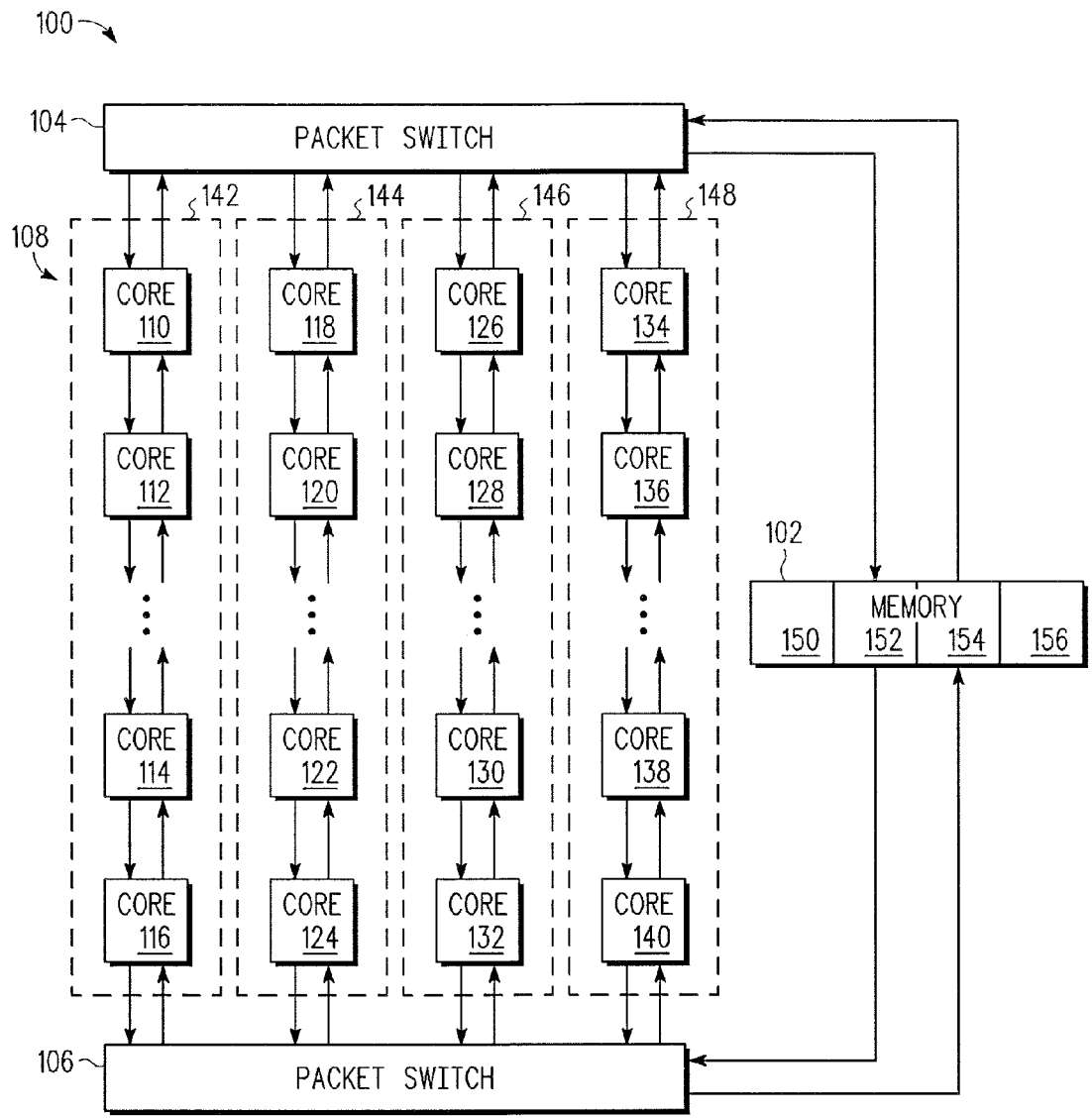
FIG. 4 is a block diagram of the system according to another embodiment.

Shown in FIG. 4 is a system 100 comprising a memory 102, a packet switch 104, a packet switch 106, and an array 108 of cores. Array 108 comprises coherency groups 142, 144, 146, and 148. Memory 102 has partitions 150, 152, 154, and 156 associated with coherency groups 142, 144, 146, and 148, respectively. Coherency group 142 comprises a plurality of cores which includes more than four cores. Four cores are shown. The four cores that are shown comprising coherency group 142 comprise a core 110 coupled to packet switch 104, a core 112 coupled to core 110, a core 116 coupled to packet switch 106, and a core 114 coupled to core 116. The four cores that are shown comprising coherency group 144 comprise a core 118 coupled to packet switch 104, a core 120 coupled to core 118, a core 124 coupled to packet switch 106, and a core 122 coupled to core 124. The four cores that are shown comprising coherency group 146 comprise a core 126 coupled to packet switch 104, a core 128 coupled to core 126, a core 132 coupled to packet switch 106, and a core 130 coupled to core 132. In addition to there being additional cores to those shown in the coherency groups, there may be other coherency groups than those shown. Packet switches 104 and 106 are coupled to memory 102. The operation is similar that of system 10 of FIG. 1 with the additional feature that the packet switch closest to the core providing the packet is the one that writes the memory. One exemplary operation is for core 114 transferring a packet to memory 102. In such case core 114 transfers the packet to core 116. Core 116 transfers the packet to packet switch 106. Packet switch 106 writes the data from the packet switch to partition 150 of memory 102. Additionally, core 114 transfers the packet, or at least the address or addresses of the packet toward cores 112 and 110. All of the packets in a coherency group are then able to keep their caches coherent. System 100 then allows for the packet to take the shortest distance to the end of the coherency group by having both terminals of coherency group terminating at a packet switch.

Figure 5:
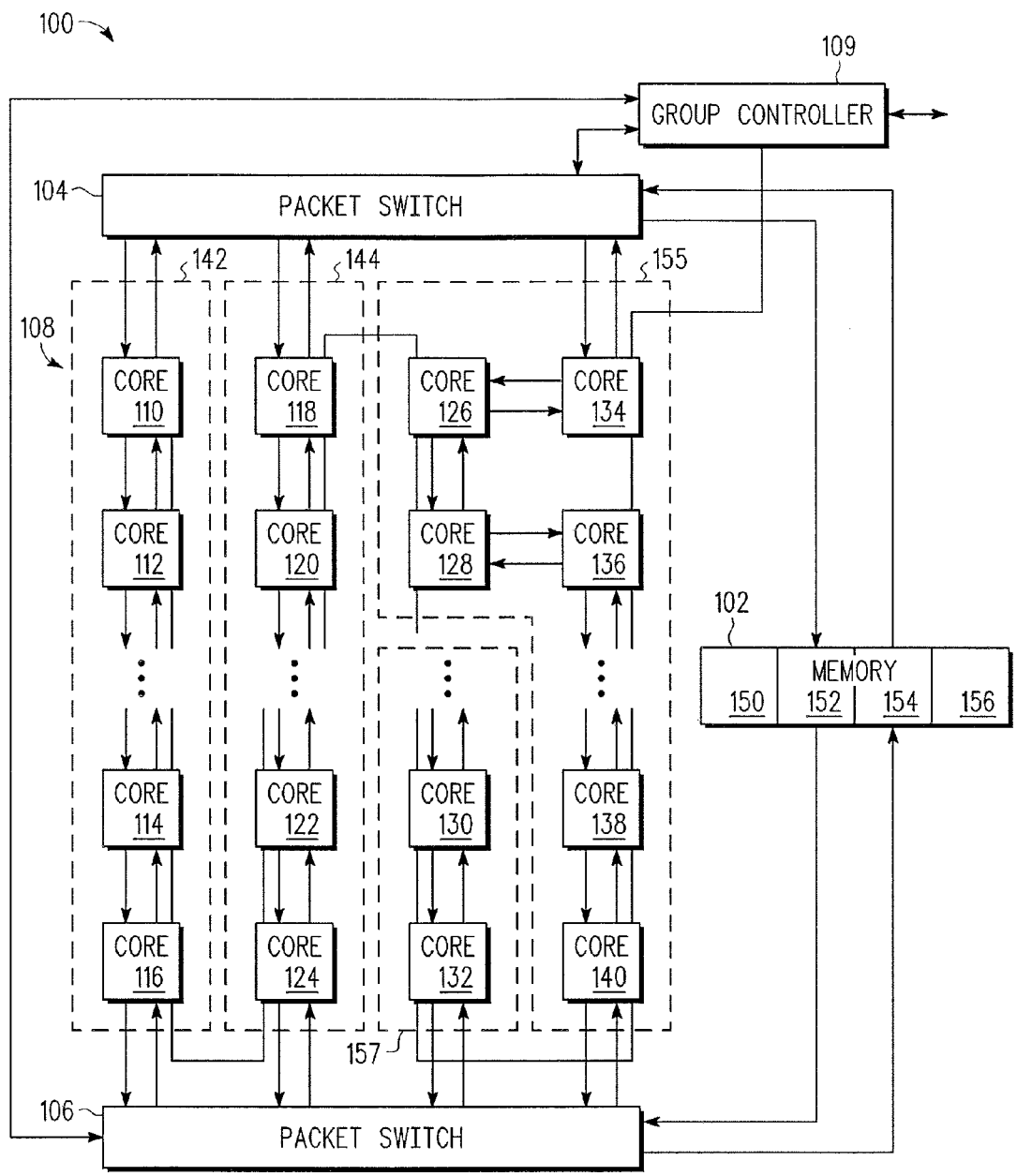
FIG. 5 is block diagram of the system of FIG. 4 in an alternative configuration.

Shown in FIG. 5 is system 10 with the cores reconfigured. System 10 additionally has a group controller 109 having an output threaded through all of the cores. This output is analogous to line 69 shown in FIG. 2 and provides configuration information to the cores. Group controller 109 is analogous to group controller 75 shown in FIG. 3 and has a connection to packet switches 104 and 106 and a connection to an external port. In this example, group controller provides configuration information that results in system 100 reconfiguring so that the cores from coherency groups 146 and 148 are reconfigured into coherency groups 155 and 157. Coherency group 155 comprises core 134 coupled to packet switch 104, core 126 coupled to core 134, core 128 coupled to core 126, core 136 coupled to core 128, core 140 coupled to packet switch 106, and core 138 coupled to core 140. There is at least one core between cores 136 and 138. Coherency group 157 comprises core 132 coupled to packet switch 106 and core 130 coupled to core 132. Coherency group 157 is coupled to packet switch 106 but not packet switch 104.

Systems 10 and 100 are particularly useful in the case where there is a large number of cores. Serial coupling of packets is efficient for maintaining coherency, especially by having distinct coherency groups that are limited to writing only certain areas of the memory. Coherency is easily maintained by the serial connection of the cores within a coherency group and by the coherency groups being maintained separately. Further, the coherency groups can be reconfigured into different sizes. Cores that become defective can even be kept from being in any coherency group. As the number of cores increases, the utility of high speed serial paths will provide more efficiency in the ability to utilize multiple cores and maintain their coherency.

Numerous applications can benefit from the proposed method and apparatus. For example, the cores may include a failure detection circuitry that can provide feedback to the group controller, which can use this feedback to reconfigure the remaining cores to overcome the faulty core. The cores may include, for example, temperature detection circuitry that can provide feedback to the group controller, which can use this feedback to reconfigure the cores to better distribute heat dissipation in a processing system. The cores may include wear level circuitry that can provide feedback to the group controller, which can use this feedback to reconfigure the cores to better distribute wear level of the cores. During operation, tasks may be dynamically allocated to different cores and respective coherency groups, thus allowing for improved usage of a processing system having a plurality of cores.

By now it should be appreciated that there has been provided a method for operating an information system within an integrated circuit. The method includes generating a first packet of information by a first processor core of a multi processor core circuit of the integrated circuit, wherein the first packet of information is directed to a memory. The method further includes propagating the first packet of information to the memory from the first processor core, wherein the propagating includes propagating the first packet via a second processor core of the multi processor core circuit, wherein the propagating the first packet via a second processor core includes receiving the first packet by the second processor core and transmitting the first packet by the second processor core. The method may be further characterized by the propagating to the memory including propagating to the memory via a packet switch circuit, the second processor core transmitting the packet to the packet switch circuit. The method may be further characterized by the multi processor core circuit including a third processor core, wherein the third processor core does not receive write coherency information of the first packet. The method may further comprise transmitting write coherency information by the first processor core to a fourth processor core of the multi processor core circuit, wherein the fourth processor core receives the write coherency information from the first processor core, wherein the fourth processor core uses the write coherency information to determine if the first packet is modifying data in the memory at a location that is cached in the fourth processor core. The method may further comprise transmitting the write coherency information by the fourth processor core to a fifth processor core of the multi processor core circuit, wherein the fifth processor core uses the write coherency information to determine if the first packet is modifying data in the memory at a location that is cached in the fifth processor core. The method may further comprise generating a second packet of information by the third processor core, wherein the second packet of information is directed to the memory, and propagating the second packet of information to the memory, wherein the propagating includes propagating the second packet via a fourth processor core of the multi processor core circuit and a packet switch circuit, wherein the propagating the packet via a fourth processor core includes receiving the information packet by the fourth processor core and transmitting the packet by the fourth processor core. The method may be further characterized by the first processor core and the second processor core not receiving write coherency information of the second packet, and the fourth processor core not receiving write coherency information of the first packet. The method may be further characterized by the propagating the first packet of information to the memory including propagating the first packet to a first partition of the memory that is accessible by the first processor core and the second processor core and not the third processor core and the fourth processor core, and the propagating the second packet of information to the memory including propagating the second packet to a second partition that is accessible by the third processor core and the fourth processor core and not the first processor core and the second processor core. The method may be further characterized by the first partition and the second partition having non overlapping addresses. The method may be further characterized by during the propagating, the multi processor core circuit including a first coherency group, wherein the first coherency group includes a first plurality of processor cores of the multi processor core circuit including the first processor core and the second processor core, the processor cores of the first coherency group are serially communicatively coupled to propagate information packets, each processor core of the first coherency group receiving cache coherency information from write packets to the memory generated by other processor cores of the first coherency group. The method may be further characterized by during the propagating, the multi processor core circuit including a second coherency group, wherein the second coherency group includes a second plurality of processor cores of the multi processor core circuit, the processor cores of the second coherency group are serially communicatively coupled to propagate information packets, each processor core of the second coherency group receiving cache coherency information from write packets to the memory generated by other processor cores of the second coherency group and does not receive cache coherency information of write packets to the memory generated by the processor cores of the first coherency group. The method may be further characterized by during the propagating, the multi processor core circuit including a third coherency group, wherein the third coherency group includes a third plurality of processor cores of the multi processor core circuit, the processor cores of the third coherency group are serially communicatively coupled to propagate information packets, each processor core of the third coherency group receiving cache coherency information from write packets to the memory generated by other processor cores of the third coherency group and does not receive cache coherency information of write packets to the memory generated by the processor cores of the first coherency group and by the processor cores of the second coherency group. The method may be further characterized by, during another time, the multi processor core circuit including a third coherency group of processor cores of the multi processor core circuit and a fourth coherency group of processor cores of the multi processor core circuit, wherein the third coherency group includes at least one processor core of the first plurality of processor cores and at least one processor core of the second plurality of processor cores, the processor cores of the third coherency group are serially communicatively coupled to propagate information packets, each processor core of the third coherency group receiving cache coherency information from write packets to the memory generated by other processor cores of the third coherency group and does not receive cache coherency information of write packets to the memory generated by processor cores of the fourth coherency group, generated by processor cores of the first coherency group not in the third coherency group, and generated by processor cores of the second coherency group not in the third coherency group, and the fourth coherency group including at least one processor core of the first plurality of processor cores, the processor cores of the fourth coherency group are serially communicatively coupled to propagate information packets, each processor core of the fourth coherency group receiving cache coherency information from write packets to the memory generated by other processor cores of the fourth coherency group and does not receive cache coherency information of write packets to the memory generated by processor cores of the third coherency group, generated by processor cores of the first coherency group not in the fourth coherency group, and generated by processor cores of the second coherency group not in the fourth coherency group. The method may further comprise writing data of the packet to a location in the memory, wherein an address of the location is indicated in the packet. The method may be further characterized by the propagating the first packet of information including propagating the first packet by a packet based protocol having ordered packets that support flow control and multiple prioritized transactions.

Also described is an apparatus including an integrated circuit that includes a multi processor core circuit. The multi processor core circuit is operable to include a first coherency group, wherein the first coherency group includes a first plurality of processor cores of the multi processor core circuit, the processor cores of the first coherency group are serially communicatively coupled to propagate information packets, wherein each processor core of the first coherency group receives cache coherency information from write packets to a memory generated by other processor cores of the first coherency group. The multi processor core circuit is operable to further include a second coherency group, wherein the second coherency group includes a second plurality of processor cores of the multi processor core circuit, the processor cores of the second coherency group are serially communicatively coupled to propagate information packets, wherein each processor core of the second coherency group receives cache coherency information from write packets to the memory generated by other processor cores of the second coherency group and does not receive cache coherency information of write packets to the memory generated by the processor cores of the first coherency group. The apparatus is further characterized by each processor core of the first coherency group not receiving cache coherency information of write packets to the memory generated by the processor cores of the second coherency group. The integrated circuit may further comprise a packet switch circuit, and may further be characterized by the memory, the multi processor core circuit communicatively being coupled to the memory through the packet switch circuit. The integrated circuit may further comprise a controller coupled to processor cores of the multi processor core circuit, the controller providing coherency control information for grouping the processor cores of the multi processor core circuit into coherency groups. The multi processor core circuit is operable to include a third coherency group of processor cores of the multi processor core circuit and a fourth coherency group of processor cores of the multi processor core circuit, wherein the third coherency group includes at least one processor core of the first plurality of processor cores and at least one processor of the second plurality of processor cores, the processor cores of the third coherency group are serially communicatively coupled to propagate information packets, wherein each processor core of the third coherency group receives cache coherency information from write packets to the memory generated by other processor cores of the third coherency group and does not receive cache coherency information of write packets to the memory generated by processor cores of the fourth coherency group, generated by processor cores of the first coherency group not in the third coherency group, and generated by processor cores of the second coherency group not in the third coherency group, and the apparatus may be further characterized by the fourth coherency group including at least one processor core of the first plurality of processor cores, the processor cores of the fourth coherency group are serially communicatively coupled to propagate information packets, wherein each processor core of the fourth coherency group receives cache coherency information from write packets to the memory generated by other processor cores of the fourth coherency group and does not receive cache coherency information of write packets to the memory generated by processor cores of the third coherency group, generated by processor cores of the first coherency group not in the fourth coherency group, and generated by processor cores of the second coherency group not in the fourth coherency group. The coherency group may be further characterized by being serially communicatively coupled via communication links between the processor cores of the first coherency group, wherein the communication links includes at least one of the group consisting of optical communication links, wireless radio frequency communication links, and a low voltage differential signaling communication links.

Although the invention is described herein with reference to specific embodiments, various modifications and changes can be made without departing from the scope of the present invention as set forth in the claims below. For example, a single line was drawn serially through the cores from the group controller, this may be achieved with multiple lines or different lines from the group controller. Further, all of the cores of a coherency group were described as being directly connected together, however, it may be desirable to have multiple systems such as system 100 in which cores from each such system may be in the same coherency group. In such case the group controllers from each system could be used to coordinate the coherency between systems. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. An apparatus comprising:
 an integrated circuit including a multi processor core circuit, wherein the multi processor core circuit is operable to include:
  a first coherency group, wherein
   the first coherency group includes a first plurality of processor cores of the multi processor core circuit,
   the processor cores of the first coherency group are serially communicatively coupled to propagate information packets, wherein
   each processor core of the first coherency group receives cache coherency information from write packets to a memory generated by other processor cores of the first coherency group;
  a second coherency group, wherein
   the second coherency group includes a second plurality of processor cores of the multi processor core circuit, the processor cores of the second coherency group are serially communicatively coupled to propagate information packets, wherein each processor core of the second coherency group receives cache coherency information from write packets to the memory generated by other processor cores of the second coherency group and does not receive cache coherency information of write packets to the memory generated by the processor cores of the first coherency group;

wherein each processor core of the first coherency group does not receive cache coherency information of write packets to the memory generated by the processor cores of the second coherency group.

2. The apparatus of claim 1, wherein the integrated circuit further comprises:

a packet switch circuit; and the memory, the multi processor core circuit communicatively coupled to the memory through the packet switch circuit.

3. The apparatus of claim 1, wherein the integrated circuit further comprises:

a controller coupled to processor cores of the multi processor core circuit, the controller providing coherency control information for grouping the processor cores of the multi processor core circuit into coherency groups.

4. The apparatus of claim 1 wherein the multi processor core circuit is operable to include:

a third coherency group of processor cores of the multi processor core circuit and a fourth coherency group of processor cores of the multi processor core circuit, wherein the third coherency group includes at least one processor core of the first plurality of processor cores and at least one processor of the second plurality of processor cores, the processor cores of the third coherency group are serially communicatively coupled to propagate information packets, wherein each processor core of the third coherency group receives cache coherency information from write packets to the memory generated by other processor cores of the third coherency group and does not receive cache coherency information of write packets to the memory generated by processor cores of the fourth coherency group, generated by processor cores of the first coherency group not in the third coherency group, and generated by processor cores of the second coherency group not in the third coherency group;

wherein the fourth coherency group includes at least one processor core of the first plurality of processor cores, the processor cores of the fourth coherency group are serially communicatively coupled to propagate information packets, wherein each processor core of the fourth coherency group receives cache coherency information from write packets to the memory generated by other processor cores of the fourth coherency group and does not receive cache coherency information of write packets to the memory generated by processor cores of the third coherency group, generated by processor cores of the first coherency group not in the fourth coherency group, and generated by processor cores of the second coherency group not in the fourth coherency group.

5. The apparatus of claim 1 wherein the first coherency group is serially communicatively coupled via communication links between the processor cores of the first coherency group, wherein the communication links includes at least one of the group consisting of optical communication links, wireless radio frequency communication links, and a low voltage differential signaling communication links.

* * * * *